(12) United States Patent
Yellin et al.

(10) Patent No.: US 7,826,866 B2
(45) Date of Patent: Nov. 2, 2010

(54) SYSTEM, APPARATUS AND METHOD TO ROUTE RADIO FREQUENCY SIGNALS

(75) Inventors: Daniel Yellin, Ra'anana (IL); Eliav Zipper, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 576 days.

(21) Appl. No.: 11/436,174

(22) Filed: May 18, 2006

(65) Prior Publication Data
US 2007/0268876 A1  Nov. 22, 2007

(51) Int. Cl.
*H04M 1/00* (2006.01)
*H04B 7/00* (2006.01)

(52) U.S. Cl. .................. 455/553.1; 455/41.2; 455/550.1

(58) Field of Classification Search .............. 455/552.1, 455/553.1, 41.2, 575.7; 370/328, 329
See application file for complete search history.

(56) References Cited

U.S. PATENT DOCUMENTS

| | | | |
|---|---|---|---|
| 5,778,024 A | 7/1998 | McDonough | |
| 7,024,222 B2 * | 4/2006 | Gorsuch | 455/553.1 |
| 7,058,364 B2 * | 6/2006 | Atkinson et al. | 455/76 |
| 7,142,882 B2 * | 11/2006 | Schmidt | 455/552.1 |
| 7,363,051 B2 * | 4/2008 | Bridgelall | 455/553.1 |
| 7,463,864 B2 * | 12/2008 | Vassiliou et al. | 455/73 |
| 2004/0213262 A1 | 10/2004 | Choi | |
| 2005/0180454 A1 | 8/2005 | Lee et al. | |

FOREIGN PATENT DOCUMENTS

KR  2004-79696 A  9/2004

* cited by examiner

*Primary Examiner*—Un C Cho
(74) *Attorney, Agent, or Firm*—Pearl Cohen Zedek Latzer LLP

(57) ABSTRACT

Briefly, a wireless communication device having two or more different wireless radio frequency (RF) units operably coupled to a router by two or more respective buses. The router is able to route bit streams of radio frequency signals from a digital baseband unit to one of the two or more RF units via one of the two or more buses. A method for routing the bit streams is also provided.

21 Claims, 3 Drawing Sheets

SYSTEM, APPARATUS AND METHOD TO ROUTE RADIO FREQUENCY SIGNALS

BACKGROUND OF THE INVENTION

Some hybrid wireless communication systems may include two or more wireless communication networks, for example, a wireless local area network (WLAN), a cellular communication network, a broadband wireless network, personal area network (PAN) or the like. For example, a platform may include two or more different wireless transceivers such as, for example, a cellular transceiver, a broadband transceiver and a PAN transceiver.

The cellular transceiver may operate according to a Global System for Mobile Communications (GSM) and/or Wideband Code Division Multiple Access (WCDMA) channel access technologies. The wireless broadband transceiver may be operated according to IEEE 802.16e standard also known in the art as WiMAX. The PAN transceiver may be operated according to IEEE 802.15.1. standard, also known in the art as Bluetooth technology.

Integration of disruptive communication technologies such as, for example, cellular, broadband and/or Bluetooth on the same platform is difficult and expensive.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
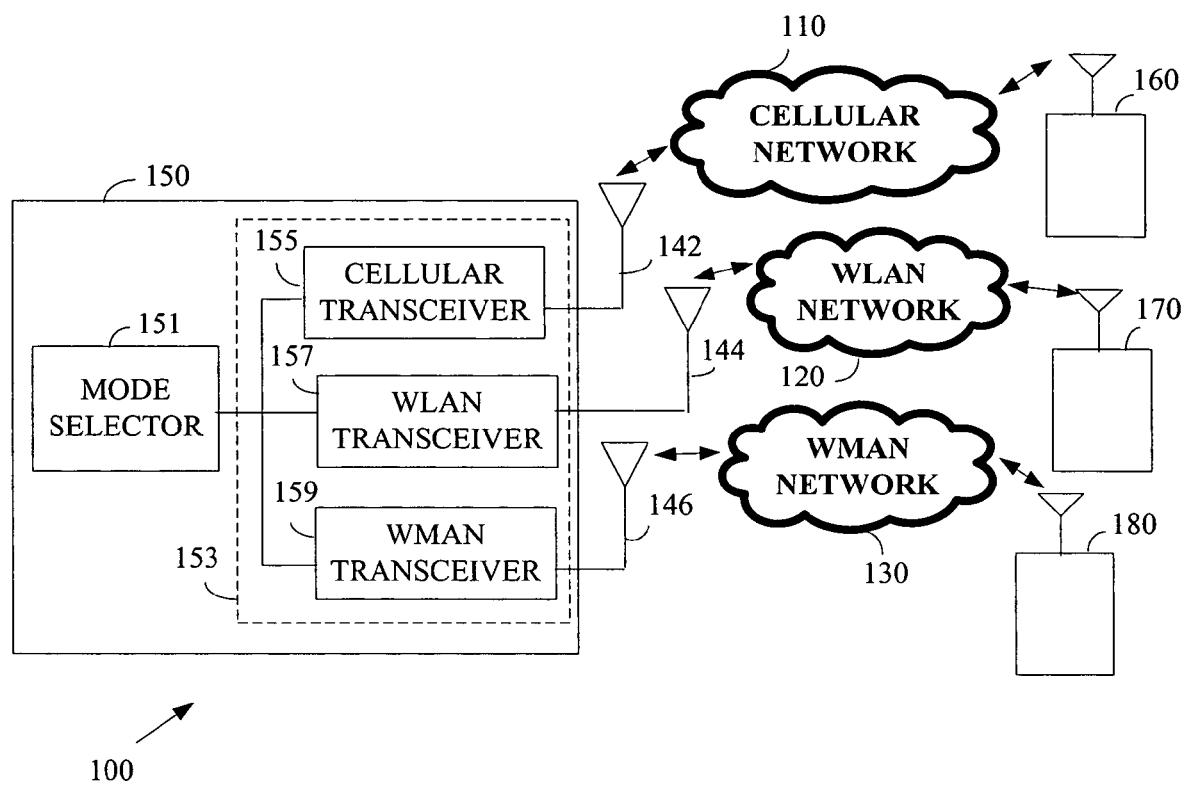
FIG. 1 is a schematic block diagram of a wireless communication system according to some exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

It should be understood that the present invention may be used in a variety of applications. Although the present invention is not limited in this respect, the circuits and techniques disclosed herein may be used in many apparatuses such as, for examples modems, wireless local area network (WLAN) stations, wireless metropolitan area network (WPAN) stations and/or devices or the like. Portable communication devices intended to be included within the scope of the present invention may include, by a way of example only, cellular radiotelephone portable communication devices, digital communication system portable devices, and the like.

Types of cellular radiotelephone systems intended to be within the scope of the present invention include, although are not limited to, Global System for Mobile communication (GSM) cellular radiotelephone, General Packet Radio Service (GPRS), Extended GPRS (EGPRS), and the like.

For simplicity, although the scope of the invention is in no way limited in this respect, embodiments of the present that will be described below may be related to a platform of two or more wireless units which utilized two or more different wireless medium access schemes, respectively. The term "plurality" may be used throughout the specification to describe two or more components, devices, elements, parameters and the like. For example, "plurality of mobile stations" describes two or more mobile stations. In addition, it should be known to one skilled in the art that the term "a portable communication device" may refer to, but is not limited to, a mobile station, a portable radiotelephone device, a cellphone, a cellular device, personal computer, Personal Digital Assistant (PDA), user equipment and the like.

Some embodiments of the invention may be implemented, for example, using a machine-readable medium or article which may store an instruction or a set of instructions that, if executed by a machine (for example, by a wireless station, and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, high level design programming language, assembly language, machine code, or the like.

Although the scope and the embodiments of the present invention are not limited in this respect, a platform may be defined as a combination two or more integrated circuits (IC) with two or more semiconductor device and/or electronic components that are operably coupled by wires, buses or the like to provide one or more desired characteristics of an apparatus. In some embodiments of the invention, the platform may include a printed circuit board (PCB), a hybrid, a single IC which able to combine analog, digital, radio frequency (RF) video, audio signals and the like.

Referring firstly to FIG. 1, a schematic block diagram of a wireless communication system 100 according to some embodiments of the present invention is shown. Wireless communication system 100 may include a first wireless communication network 110, a second wireless communication network 120, and a third wireless communication network 130. In this exemplary embodiment of the invention, wireless communication system 100 may include mobile stations (MS) 150, 160 and 170. For example MS 160 may be a cellular radiotelephone, MS 170 may be an Access Point and/or wireless network interface card (NEC) or the like. MS 180 may include, for example a WMAN transceiver, if desired.

According to some embodiments of the invention, MS 150 may communicate with any one of MS 160, 170 and 180 and may include a mode selector 151, a platform 153 and antennas 142, 144 and 146. For example, platform 153 may include a cellular transceiver 155, a WLAN transceiver 157 and a WMAN transceiver 159. It should be understood that in some embodiments of the invention platform 153 may include other transceivers and/or more transceivers and/or different transceivers, for example, infra-red transceivers, Bluetooth transceivers or the like.

According to exemplary embodiments of the invention, mode selector 151 may select at least one of the transceivers 145, 147 and 159 to transmit and/or to receive RF signals from/to MS 160, 170 and 180 via at least one of the networks 110, 120 and/or 130, if desired. Antennas 142, 144 and 146 may be able to transmit and/or receive modulated RF signals according to wireless network access schemes of wireless communications networks 110, 120 and 130. Antennas 142, 144 and 146 may include, for example, a dipole antenna, an internal antenna, a monopole antenna or the like. In some embodiments of the invention, the receiver and the transmitter may use different types of antennas. Furthermore, one antenna may be used to transmit according to one wireless network access scheme while the other antennas may receive signals according to the other wireless network access schemes and vice versa, although it should be understood that the scope of the scope of the present invention is in no way limited in this respect.

According to some exemplary embodiments of the present invention, wireless communication system 100 may include a wireless communication device (e.g., MS 160) that is able to communicate with at least two different wireless systems (e.g., wireless communications networks 110, 120 and 130) which utilize at least two different medium access schemes. The wireless communication device (e.g., MS 150) may include a platform. (e.g., platform 153). Platform 150 may include two or more different wireless radio frequency (RF) units (e.g., cellular transceiver 155, WLAN transceiver 157, WMAN transceiver 159) operably coupled to a router (not shown) by two or more different buses. According to this exemplary embodiment, the router is able to route bit streams of digitally sampled RF signals from a digital baseband unit to one of the two or more RF units via one of the two or more buses. The mode selector (e.g., mode selector 151) may select a mode of operation of the router according to a medium access scheme of at least one of the wireless radio RF units, if desired.

Figure 2:
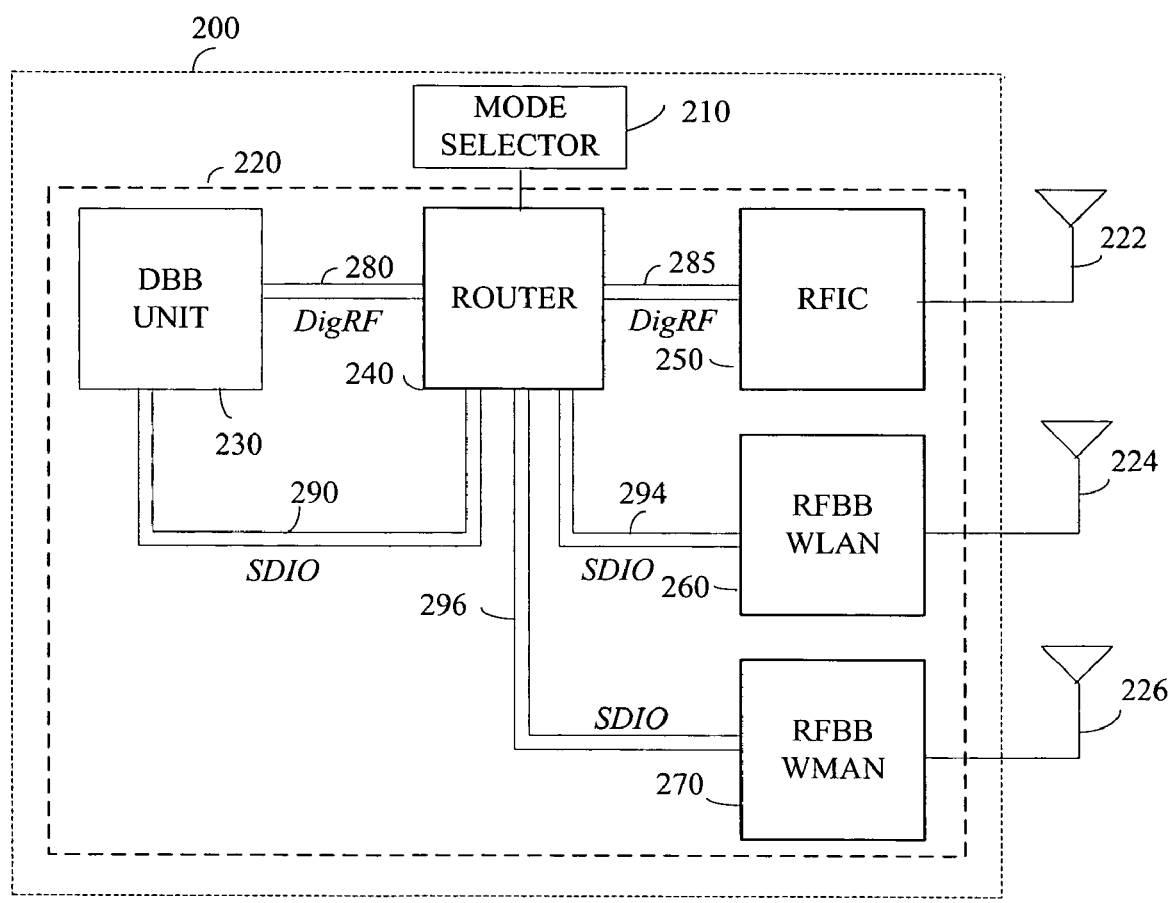
FIG. 2 is a schematic block diagram of a wireless communication device according to some exemplary embodiments of the present invention.

Turning to FIG. 2, a schematic a block diagram of a wireless communication device 200 according to exemplary embodiments of the invention is shown. Wireless communication device 200, for example a MS, may include a mode selector 210, a platform 220 and antennas 222, 224 and 226. According to this exemplary embodiment of the invention, platform 220 may include a digital baseband (DBB) unit 230, a router 230 and RF units for example, a RF integrated circuit (RFIC) 250, a RF and baseband (RFBB) unit for a WLAN 260, and a RFBB unit for a WMAN 270. A digital RF (DigRF) bus 280 may be used to transfer digitally sampled RF signals between DBB unit 230 and router 240. The digitally sampled RF signals may include bit streams that are generated from analog signals and/or bit streams that may be converted to analog RF signals, if desired. A DigRF bus 285 may be used to transfer the digitally sampled RF signals between router 240 and RFIC 250. Secure Digital Input Output (SDIO) buses 290, 294 and 296 may be used to transport signals between router 240 to DBB unit 230, RFBB unit for a WLAN 260 and an RFBB unit for a WMAN 270, respectively. It should be understood that in other exemplary embodiments of the present invention either a single antenna, an antenna array or any other antenna combinations may be coupled to RFIC 250, RFBB for a WLAN 260 and RFBB for a WMAN 270, if desired.

According to this exemplary embodiment, mode selector 210 may command router 240 to enable a RF path which includes DBB unit 230 RFIC 250 and antenna 222, to transmit and/or to receive RF signals. Mode selector 210 may command router 240 to enable a RE path which includes DBB unit 230 RFBB for a WLAN 260 and antenna 224, to transmit and/or to receive RF signals. Furthermore, mode selector 210 may command router 240 to enable a RF path which includes DBB unit 230 RFBB for a WMAN 270 and antenna 226, to transmit and/or to receive RF signals.

According to some other embodiments of the present invention, DBB unit 230 may include a digital baseband of a cellular radio that operate according to WCDMA wireless medium access scheme and RFIC 250 may include a transceiver of WCDMA. In this embodiment of the invention, DBB unit 230 may be coupled directly to RFIC 250 via DigRF bus 280 and/or 285, if desired. Router 240 may route signals of DBB unit 230 to RFBB for a WLAN 260 and/or RFBB for a WMAN 270 via SDIO bus 290, 294 and 296, if desired. According to some exemplary embodiments of the invention, SDIO bus 290 may be a bi-directional bus and may be used as a feedback bus of RFBB unit for a WLAN 260 and RFBB unit for a WMAN 270, if desired.

Figure 3:
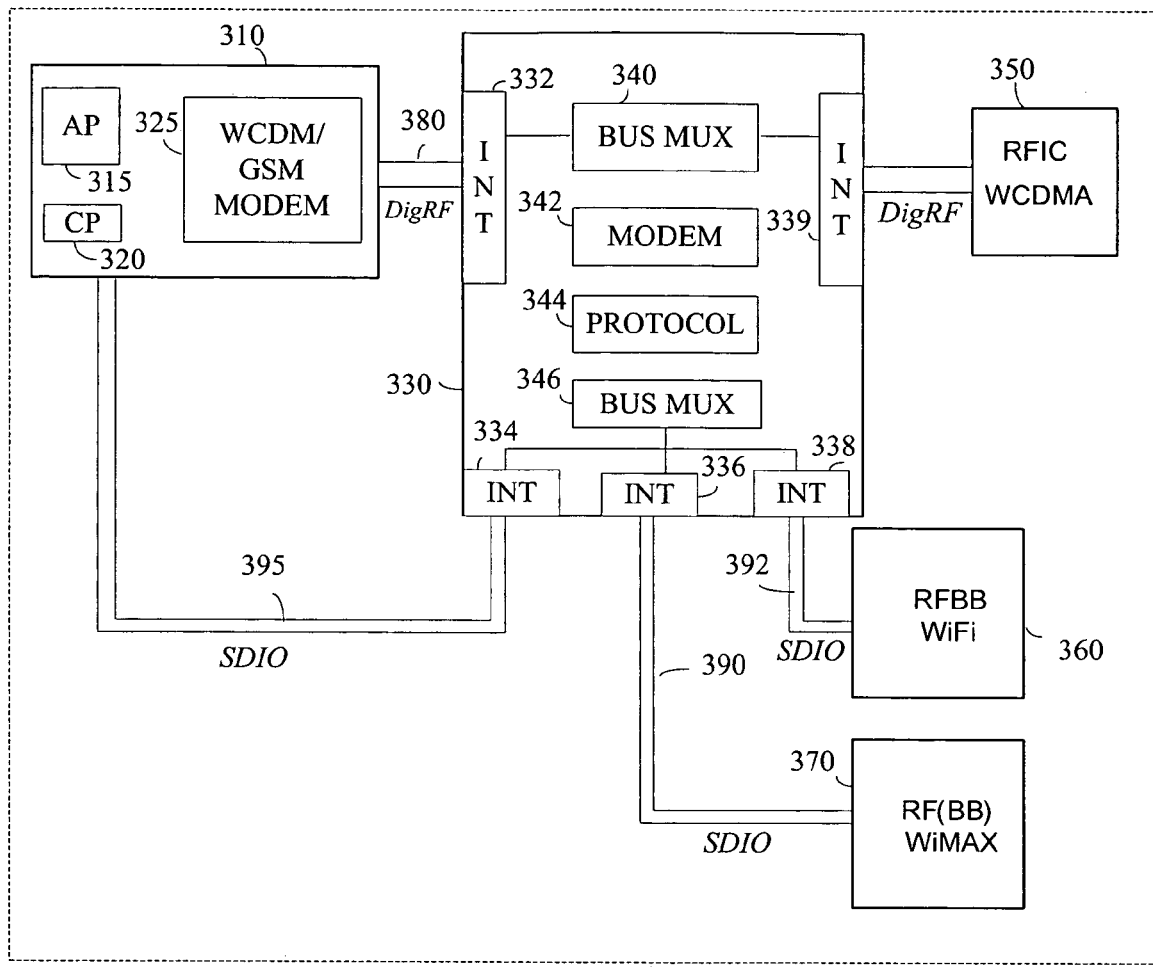
FIG. 3 is a schematic block diagram of a platform according to embodiments of the present invention.

Turning to FIG. 3 an illustration of a block diagram of a platform 300 according to embodiments of the present invention is shown. Although the scope of the present invention is not limited in this respect, platform 300 may include a digital baseband unit 310, a router 330, a RFIC 350, a RFBB for a WLAN 360 and an RFBB for a WMAN 370.

More specifically, DBB unit 310 may include an application processor (AP) 315, a communication-processor (CP) 320 and a cellular modem 325, for example, a GSM/WCDMA modem, if desired. Router 330 may include interfaces (INT) 332, 334, 336, 338 and 339, a bus multiplexer (MUX) 340, a modem 342, a protocol 344 and a bus multiplexer (MUX) 346.

According to one operational mode of this embodiment of the invention, DBB unit 310 may transmit and/or receive signals according to a WCDMA access scheme. CP 320 may operate the WCDMA access scheme and AP 320 may process digitally sampled RF signals according to embedded application, if desired. Cellular modem 325 may transmit and/or receive the digitally sampled RF signals via a DigRF bus 380. In some embodiments of the present invention cellular modem 325 may be part of CP 320. Router 330 may transport the digitally sampled RF signals from/to DBB unit 310 to/from RFIC 350, through interfaces 332 and 339 and bus multiplexer 340 of router 330. In another embodiment of the invention, DBB unit 310 may be coupled via a DigRF bus to RFIC 350, if desired.

According to other operation modes of this exemplary embodiment of the invention, router 330 may route signals (e.g., digitally sampled signals, bit streams) from/to the RF units, for example RFBB for WLAN 360 and/or a RFBB for WMAN 370, to/from DBB unit 310. For example, RFBB for WMAN 370 may transport signals via SDIO bus 390 to router 330. Interface 336 may transfer the signals to bus multiplexer 346. Protocol 344 may provide a suitable protocol to transfer the signals to DBB unit 310. Modem 342 may modulate/demodulate the signals according to a desired protocol. The modulated/demodulated signals (e.g., digitally sampled signals) may be transport via interface 334 and an SDIO bus 395 to AP 315 of DBB unit 310. AP 315 may process the signals to provide baseband signals (e.g., digital baseband signals), if desired.

According to other exemplary embodiment of the inventions, router 330 may route digitally sampled signals (e.g., bit streams) from/to the RF units, for example RFIC 350, to/from modem 342 of router 330. Protocol 344 may provide a suitable protocol, for example an access stratum (AS) protocol, to transfer the signals to DBB unit 310. The protocol level signals may be transport via interface 334 and a SDIO bus 395 to AP 315 of DBB unit 310.

Although the scope of the present invention is not limited in this respect, it should be understood that a similar method as described above may be used to transfer signals from RFBB for WLAN 360 or any other RFIC, to DBB unit 350. Furthermore, the platform may process bit streams of RF signals according to the selected medium access scheme, if desired.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An apparatus comprising:
    first and second wireless transceivers each coupled to a different antenna;
    a digital baseband unit operably coupled to a router by a digital radio frequency (DigRF) bus to transport digitally sampled radio frequency (RF) signals to the first wireless transceiver by said DigRF bus and to the second wireless transceiver by a secured digital input output (SDIO) bus, wherein the router includes a modem and a protocol to route bit streams of the digitally sampled RF signals from said digital baseband unit to each one of the first and second wireless transceivers based on the protocol; and
    a feedback bus connected at one end to the router and at the second end to said digital baseband unit via the SDIO bus to provide feedback from the first and second wireless transceivers to the baseband unit.

2. The apparatus of claim 1, wherein the router comprises a modem to transmit and receive digitally sampled RF signals via at least one of the DigRF bus and the SDIO bus.

3. The apparatus of claim 1, wherein the modem comprises a cellular modem.

4. The apparatus of claim 1, wherein the modem is able to operate according to a desired medium access scheme, which is related to at least one of the wireless transceivers.

5. A method comprising:
    transporting over a digital radio frequency (DigRF) bus bit streams of digitally sampled radio frequency (RF) signals from a digital baseband unit to a router;
    transporting from and to the router the digitally sampled RF signals to and from a first wireless transceiver via said DigRF bus and to and from a second wireless transceiver via a secured digital input output (SDIO) bus; and
    providing a feedback signal by the router via the SDIO bus from the first and second wireless transceivers to the baseband unit.

6. The method of claim 5, wherein providing the feedback signal comprises utilizing a protocol to transport the bit streams between at least one of the wireless transceivers and the digital baseband unit.

7. The method of claim 5, comprising:
    modulating/demodulating the bit streams of digitally sampled radio frequency signals based on a desired medium access scheme related to at least one of the wireless transceivers.

8. A wireless communication device comprising:
    a first wireless transceiver operably coupled to a router by a digital radio frequency (DigRF) bus and a second wireless transceiver operably coupled to the router by a secured digital input output (SDIO) bus;
    a digital baseband unit operably coupled to the router via the DigRF bus, wherein the router includes a modem and a protocol and is able to route bit streams of digitally sampled radio frequency signals (RF) from said digital baseband unit to the first and second wireless transceivers based on the protocol; and
    a mode selector operably coupled to said router to command the router to enable a RF path which includes the digital baseband unit, at least one of the DigRF bus and the SDIO bus and at least one of the wireless transceivers.

9. The wireless communication device of claim 8, wherein the modem comprises a cellular modem.

10. The wireless communication device of claim 9, wherein at least one of the wireless transceivers comprises the modem.

11. The wireless communication device of claim 9, wherein the modem is able to operate according to a desired medium access scheme, which is related to at least one of the wireless transceivers.

12. The wireless communication device of claim 8, wherein the protocol is to transport the bit streams between at least one of the wireless transceivers and the digital baseband unit.

13. A wireless communication system comprising:
    a wireless communication device able to communicate with at least two different wireless systems that utilize at least two different medium access schemes, wherein the wireless communication device includes a platform comprising:
    a first wireless transceive operably coupled to a router by a DigRF bus and a second wireless transceiver operably coupled to the router by a secured digital input output (SDIO) bus;
    a digital baseband unit operably coupled to the router via the DigRF bus, wherein the router includes a modem and a protocol and is able to route bit streams of digitally sampled radio frequency signals (RF) from said digital baseband unit to first and second wireless transceivers based on the protocol; and
    a mode selector operably coupled to said router to command the router to enable a RF path which includes the digital baseband unit, at least one of the DigRF bus and the SDIO bus and at least one of the wireless transceivers.

14. The wireless communication system of claim 13, wherein the modem comprises a cellular modem.

15. The wireless communication system of claim 14, wherein at least one of the wireless transceivers comprises the modem.

16. The wireless communication system of claim 14, wherein the modem is able to operate according to a desired medium access scheme, which is related to at least one of the wireless transceivers.

17. The wireless communication system of claim 14, wherein the platform is able to provide radio frequency (RF) signals from the two or more wireless transceivers to at least one antenna.

18. The wireless communication system of claim 13, wherein the protocol is to transport the bit streams between at least one of the wireless transceivers and the digital baseband.

19. A wireless communication device comprising:
- a first digital radio frequency (DigRF) bus to transfer bit streams of digitally sampled RF signals from a digital baseband unit, which includes a Global-System-for-Mobile-Communication/ Wideband-Code-Division-Multiple-Access (GSM/WCDMA) modem, to a router which includes a modem, a bus multiplexer and an access stratum protocol, and from the router to a cellular transceiver coupled to a first antenna;
- a first secure digital input-output (SDIO) bus to transport two or more signals between the router and a radio frequency baseband (RFBB) for a wireless local area network (WLAN) transceiver coupled to a second antenna and between the router and a RFBB for a Wireless Metropolitan Area Networks (WMAN) transceiver coupled to a third antenna; and
- a mode selector operably coupled to said router to command the router to enable an RF path that includes the digital baseband unit and at least one of a RF integrated circuit (RFIC) including a transceiver of WCDMA, RFBB for WLAN and RFBB for WMAN.

20. The wireless communication device of claim 19, wherein the router comprises:
- a first interface and a second interface, the first interface and the second interface operably coupled to said bus multiplexer to transport the digitally sampled RE signals from/to the digital baseband unit and to/from the RFIC.

21. The wireless communication device of claim 20, wherein the access stratum protocol is able to transfer the digitally sampled RF signal for at least one of the RFIC, RFBB for WLAN and RFBB for WMAN to the digital baseband via the SDIO) bus.

* * * * *